United States Patent [19]

Agar et al.

[11] Patent Number: 5,389,953
[45] Date of Patent: Feb. 14, 1995

[54] NON-IMPACT PRINTER MODULE WITH IMPROVED BURN-IN TESTING CAPABILITY AND METHOD USING SAME

[75] Inventors: Keith W. Agar, Henrietta; Jeffrey G. La Pointe, Spencerport, both of N.Y.

[73] Assignee: Eastman Kodak Company, Rochester, N.Y.

[21] Appl. No.: 636,841

[22] Filed: Jan. 2, 1991

[51] Int. Cl.$^6$ .................................. B41J 2/435
[52] U.S. Cl. ........................................ 347/5; 347/237
[58] Field of Search ................ 346/107 R, 1.1; 307/443, 296.5, 296.8; 323/315, 316, 317

[56] References Cited

U.S. PATENT DOCUMENTS

| 4,074,320 | 2/1978 | Kapes, Jr. ................. | 358/300 |
| 4,839,671 | 6/1989 | Theodoulou et al. .......... | 346/154 X |
| 4,875,057 | 10/1989 | Hediger et al. .............. | 346/107 R |
| 4,896,056 | 1/1990 | Kunieda et al. ............. | 307/443 |
| 4,918,462 | 4/1990 | Tomita et al. .............. | 346/107 R |
| 4,951,098 | 8/1990 | Albergo et al. ............. | 346/107 R X |

OTHER PUBLICATIONS

Rudolf F. Graf, Radio Shack Dictionary of Electronics, Howard W. Sams & Co., Inc., Indianapolis, Ind., 1974, p. 291.
A Monolithically Integrated 128 LED Driver and its Application, IEEE Transactions on Consumer Electronics, vol. CE-32, No. 1, Feb. 1986, pp. 26–31, by Burkhart et al.

Primary Examiner—Benjamin R. Fuller
Assistant Examiner—David Yockey
Attorney, Agent, or Firm—Norman Rushefsky

[57] ABSTRACT

A testable assembly that includes a plurality of recording elements such as LED's for burn-in testing or the like is described. The assembly includes LED chip arrays, integrated circuit driver chips and spreader boards for distributing signals to the driver chips. The spreader boards each include a minimum number of test pads for providing power and control signals during burn-in testing. The driver chip is designed for grey level recording using a plurality of data bits to control the pixel recording period for each LED. Burn-in testing is accomplished without even provision for real data signals. Rather, pseudo data signals are generated internally by a weak current pull-up circuit associated with each data input lead of the driver chip. This pull-up circuit is easily overridden by normal data signals during normal printhead operation. In addition to power signals, an exposure clock and latch signal are provided at the input pad for varying power and duty signal to the LED's during testing.

18 Claims, 12 Drawing Sheets

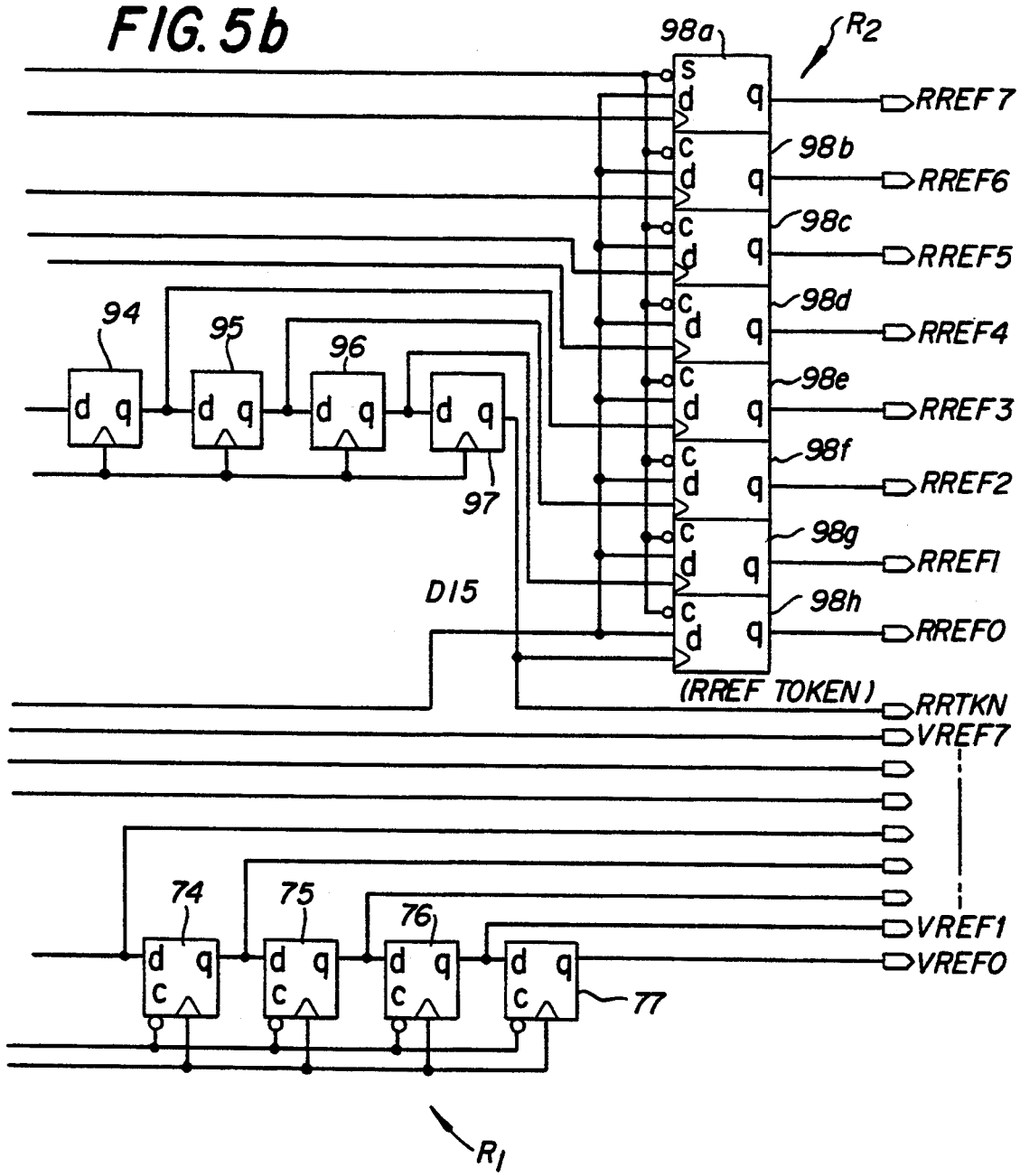
FIG.5b
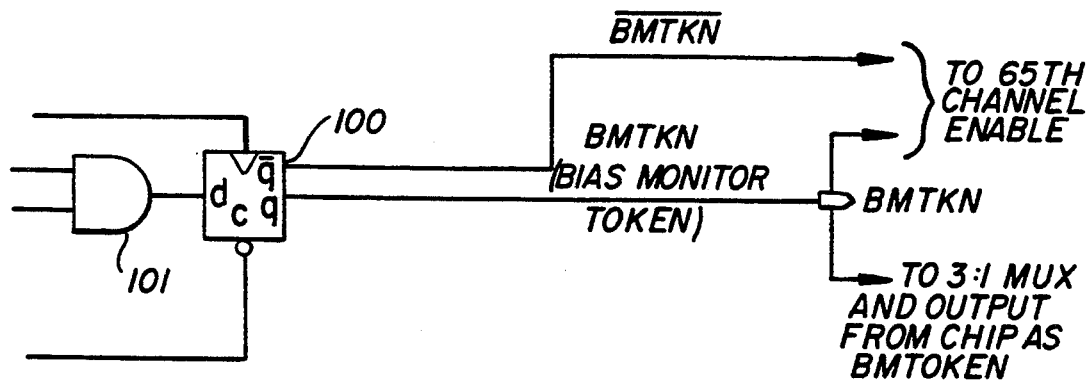

TILE BURN IN TIMING

NON-IMPACT PRINTER MODULE WITH IMPROVED BURN-IN TESTING CAPABILITY AND METHOD USING SAME

BACKGROUND OF THE INVENTION

1. Field of the Invention

The present invention relates to non-impact printing apparatus and methods for use in recording and more particularly to those employing light-emitting diode recording elements.

2. Brief Description of the Prior Art

In the prior art as exemplified by U.S. Pat. No. 4,746,941 a light-emitting diode (LED) printhead may include several thousand LED's arranged in a row. Typically, these LED's will be formed on individual LED chip arrays carrying say 64, 96 or 128 LED's and thirty or so of these chip arrays will be positioned end-to-end to form the string of LED's. Electrical drive current is fed to each LED using integrated circuit driver chips. Two of the driver chips, one on each side of the LED chip array will provide drive current to the LED's of that array. In order to control the timing and enablement of the drive currents, various timing and data signals are provided to the driver chips. In the case of a grey level printhead, a multibit data signal is used to determine the duration of a recording period for recording a pixel (picture element) by an individual LED. In a typical grey level printhead six data bits carried by six data lines may be used to define the duration of a recording period. In addition, power and other timing signals are required to be provided to each driver chip. Thus, perhaps each driver may require twenty input pads for receiving these different signals where power inputs are doubled to carry the increased current. With two driver chips used to drive the odd and even numbered LED's of an LED chip array there may be required 40 or more electrical connections to test the operability of an LED chip array and its two driver chips. In such a test, current is provided to the LED's at an appropriate duty cycle and the unit tested for say 1000 hours of "on" time. If a duty cycle of 50% is employed, the test period should take 2000 hours. The test is referred to as a burn-in test and relies upon the characteristic of LED's that when new, their intensities are brightest but this brightness tends to decay with age and reaches an equilibrium at about for example 1000 hours of age for some LED's. Thus, to provide a printhead that will be reasonably uniform with age, it is conventional to "burn-in" the LED's until they reach this equilibrium level.

It is known in the art to prepare the LED's and driver chips in a module so that the module may be tested and then tested modules are assembled onto a support to form the printhead. Where three LED chip arrays are provided on each module along with six driver chips, a testable module could require more than 120 electrical connections. Accessing that number of points is not practical, in addition the bond pads on the driver chips risk being damaged in the testing process where they would be engaged by signal probes.

In U.S. application Ser. No. 07/455,125, filed Dec. 22, 1989 in the names of Beaman et al, a spreader circuit board is described for distributing signals to each of three driver chips on the module. This board connects all of the driver input lines together into one common set of larger input bond pads. With two spreader boards on a module, the number of input pads to each spreader board can be reduced to say 20. This number is still difficult to be used even with precision wafer probe test fixtures connected to both sides of a typical assembly.

The making of electrical connections to these input pads is not a problem during normal printhead assembly using standard wire bonding practices. The problems manifest during initial power testing, burn-in and life testing. In initial power-up, testing could be accomplished using two sets of contacts, typically an elastomeric or wafer probe needles. These suffer from alignment mismatch, high contact resistance, limited lifetime of the contacts, complex fixturing and slow loading times. Major problems arise during elevated temperature burn-in. The previously described contact methods are typically not suitable for use in hostile environments when a highly reliable connection is required to conduct high-speed logic signals and high currents over an extended length of time, say 100 to 1000 hours.

It is, therefore, an object of the invention to provide a means for providing fewer test pad connections for burn-in testing of the recording elements of a printhead. With fewer connections, there is more available area to provide larger contact pads to more practically accommodate signal probe test pins with improved tolerance for misalignment of the pins in the testing fixture.

SUMMARY OF THE INVENTION

In accordance with the invention there is provided a testable assembly that includes a recording element, said assembly comprising a recording element; a data register for storing a digital logic data signal; a driver circuit responsive to the data signal; an input lead coupled to the data register for providing a data signal thereto; and bias circuit means coupled to said lead for providing thereto a bias signal suitable as a pseudo data signal in the absence of a real data signal on said lead.

The above and other objects and features of the present invention will become apparent from the following description taken in conjunction with the accompanying drawings.

BRIEF DESCRIPTION OF THE DRAWINGS

FIGS. 4, 4a and 4b are block diagrams of a circuit on a driver chip that is supported on the module of FIG. 1;

FIGS. 5, 5a and 5b are block diagrams of other circuit portions of the driver chip of FIGS. 4a and 4b;

DESCRIPTION OF THE PREFERRED EMBODIMENT

Because the apparatus of the type described herein are well known, the present description will be directed in particular to elements forming part of, or cooperating more directly with, the present invention.

Figure 7:
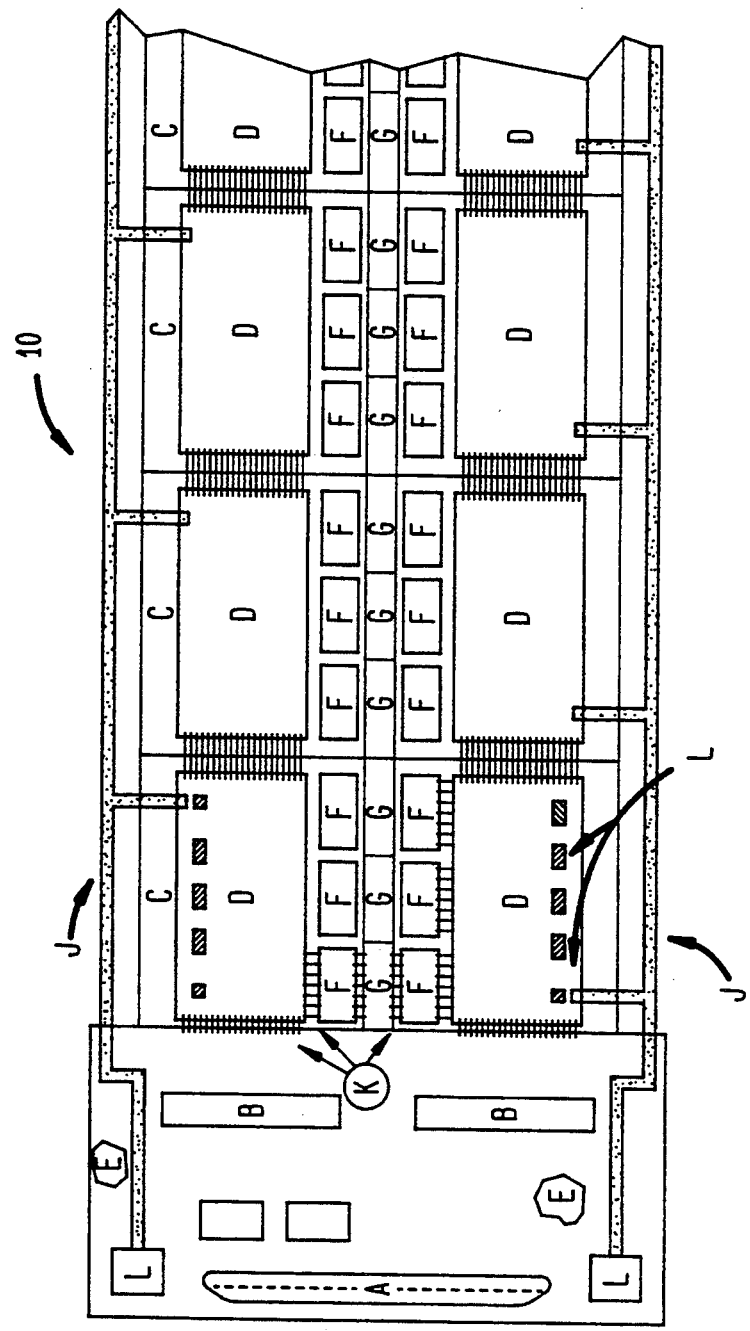
FIG. 7 is a schematic of a printhead assembled using a series of modules of FIG. 1.

The apparatus for the herein disclosed invention is typified by the printhead 10 diagram of FIG. 7; a linear array 10 of say 3584 triggerable recording elements; e.g. LED's, may be disposed to expose selectively a photosensitive image-receiver medium that is movable relative to the array by suitable conventional means (not shown). Optical means for focusing the LED's onto the medium may also be provided. In this regard, gradient index optical fiber devices such as Selfoc (trademark of Nippon Sheet Glass Co., Ltd.) arrays are highly suited. The LED's of the array are triggered into operation by means of image processing electronics that are responsive to image signal information. Depending on the duration for which any given LED is turned on, the exposure effected by such LED is more or less made. Where the medium is, say, photographic film the latent image formed line by line by selective exposure of said LED's may be subsequently developed by conventional means to form a visible image. Where the medium is an electrophotographic receptor, the LED's may be used to form an electrostatic image on a uniformly electrostatically charged photoconductor and this image developed using opaque toner particles and perhaps transferred to a copy sheet.

Figure 1:
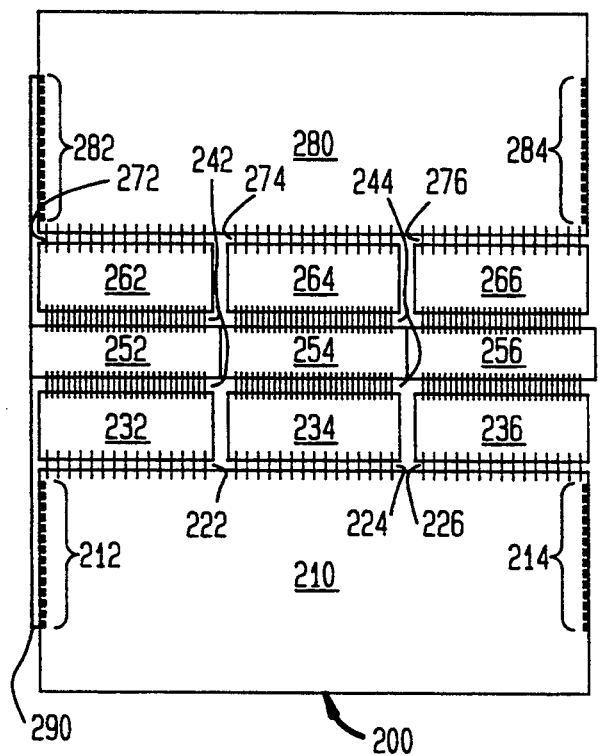
FIG. 1 is a planar view, shown enlarged, of a schematic of a driver module.

The LED's are formed on LED chip arrays, G, which incorporate 128 LED's arranged in a row. Three chip arrays are then mounted end to end upon a metal tile. Also mounted to the tile is a row of three driver chips, F, mounted to each side of the row of LED chip arrays. A spreader board, D, is mounted to the outboard side of the row of driver chips. The assembly of LED chip arrays, driver chips and spreader boards comprises a module, a typical one of which is illustrated in FIG. 1. The modules are assembled side-to-side onto a mother board to make one long continuous row of LED's. At the left end of the printhead as shown, there is provided an interface board E, which interfaces the printhead with the various data processing electronics associated with the printer. The interface board may also include pin connector A, line driver integrated circuits, B, and connection pads, L, for receiving electrical power which may then be distributed to the various modules using bus bars which extend along the length of the printhead outboard of the spreader boards. A termination board may be provided at the right end of the printhead after the last module.

As may be seen, wire bonds, K, or TAB (tape automated bonds) connect the modules in daisy chain fashion one to the other and connect the first and last modules to the interface and termination boards, respectively.

With reference now to FIG. 1, an enlarged view of one module or testable assembly 200 is shown. As may be seen this module includes LED chip arrays 252, 254, 256 flanked by rows of driver chips 232, 234, 236 and 262, 264, 266. Typically, the driver chips of one row will drive the even-numbered LED's and those in the other row will drive the odd-numbered LED's. The spreader boards 210, 280 are each a multi-layered ceramic (or FR4 or FR5) board which includes metallized leads for distributing data, power and other control signals to the driver chips. The LED arrays are each connected to two respective driver chips by a high density series of wire bonds 242, 244. The driver chips in turn are connected to the spreader boards by a series of lower density wire bonds 222, 224, 226; 272, 274, 276.

The spreader boards are connected in the daisy chain fashion indicated above using a series of bond pads 212, 214; 282, 284 arranged along the sides thereof. A tile 290 supports the components of the module 200.

Figure 2:
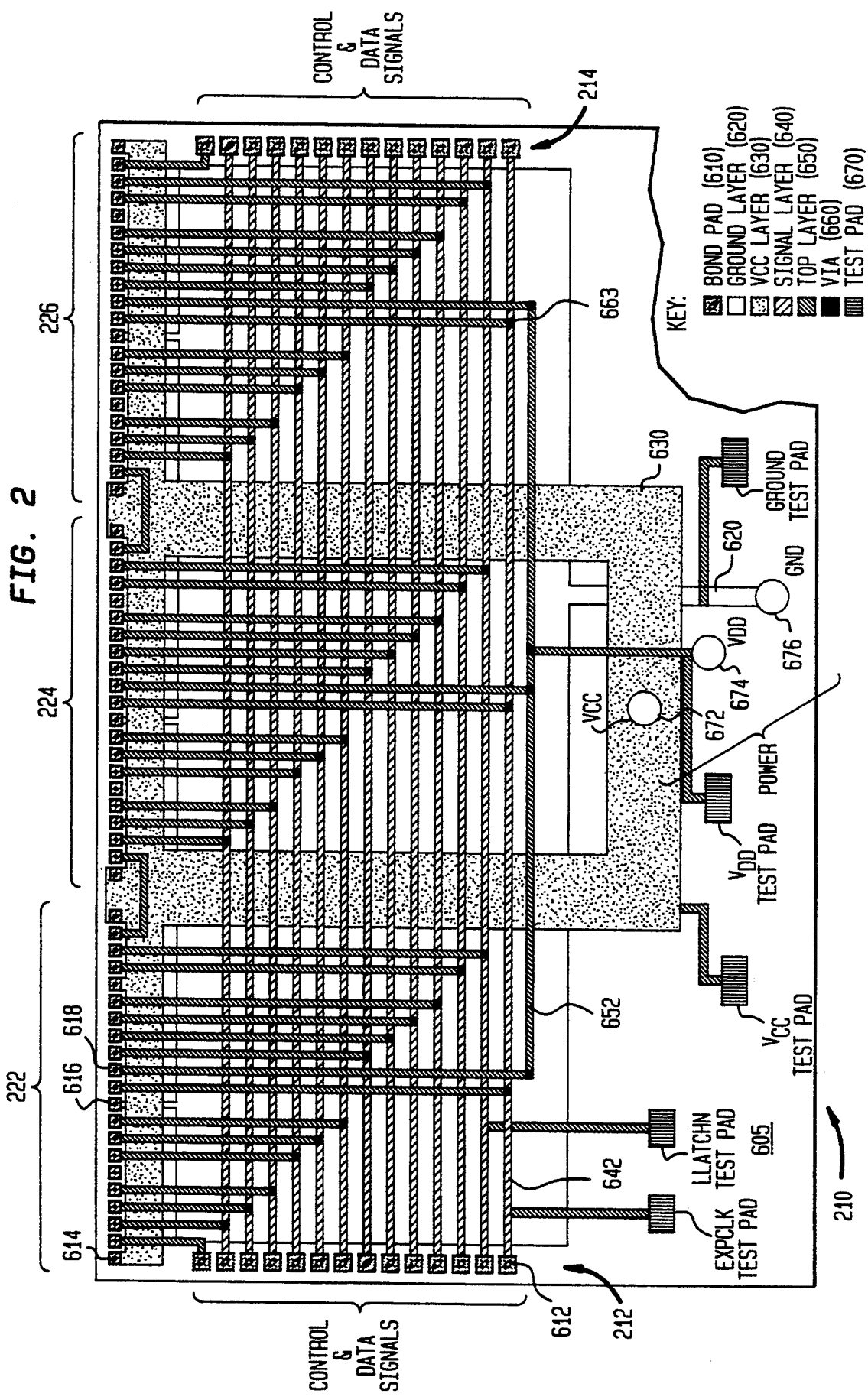
FIG. 2 is a further enlargement shown in schematic of a spreader board that is mounted on the module of FIG. 1.

With reference now to FIG. 2, further details are shown of the spreader board 210 and the multilayer metallization pattern appearing thereon. Specifically, as shown in FIG. 2, spreader board 210 is formed of rectangular ceramic substrate 605 having six distinct metallized wiring patterns situated therein. Specifically, bond pads 610, of which bond pad 612 is illustrative. A ground layer 620 is fabricated as the bottom layer on the substrate. $V_{cc}$ layer 630 overlies the ground layer. Appropriate metallization extends from ground layer 620 and $V_{cc}$ layer 630 to interconnect these layers to corresponding pads within bond pads 222, 224 and 226, specifically and illustratively bond pad 614 and 616 which are respectively interconnected to $V_{cc}$ layer 630 and ground layer 620. Buried signal layer 640 containing illustrative path 642, overlays layer 630. This signal layer is formed of metallized conductors which run between metallized bond pads 212 and 214 and are used to carry control and data signals therebetween. Overlaying buried signal layer 640 is top layer 650. The top layer contains metallized conductors which connect to the appropriate metallized conductors in layer 640 to carry data signals to appropriate pads in bond pads 222, 224 and 226 for connection to corresponding terminations on drive circuits 232, 234 and 236 wire bonded thereto (see FIG. 1). As shown in FIG. 2, layer 650 also carries voltage $V_{DD}$ to appropriate pads, such as illustrative pad 618 within bond pads 222, 224 and 226 for application to these drive circuits. Metallized vias 660, of which via 663 is illustrative, are used to form interconnections between adjacent layers. Furthermore, each spreader board contains staggered metallized thru holes 672, 674 and 676 that are respectively connected to V layer 630, top layer 650 and ground layer 620 and which collectively are adapted to connect to a bus bar assembly in order to appropriately route power, i.e. voltage levels $V_{cc}$ and $V_{DD}$ and ground, from the bus bars assembly to the drive ground, from the bus bar assembly to the drive circuits connected to this board. Thus, the spreader board includes a series of input pads 212, a series of output pads 214 for conveying the daisy chain signals to the next module and series of distribution pads 222, 224, 226 for distributing the data, power and control signals to the respective driver chips supported by the spreader board. Openings 672, 674 and 676 are provided for accepting projecting pods from respective bus bars carrying power signals $V_{cc}$, $V_{DD}$ and GND when the printhead is fully assembled. These bus bars are not present during burn-in testing of the modules and as may be seen test pads are provided and connected by leads to the appropriate lines for distribution to the respective LED's. Specifically, test pads are provided for an exposure clock signal (EXPCLK) a signal LLATCHN, which signals will be discussed further below and for power and ground ($V_{cc}$, $V_{DD}$ and GND). As may be seen, the number of test pads, 5, is significantly less than the number of test pads and connections otherwise required to operate the module and the reasons for such will be described below.

Figure 4A:
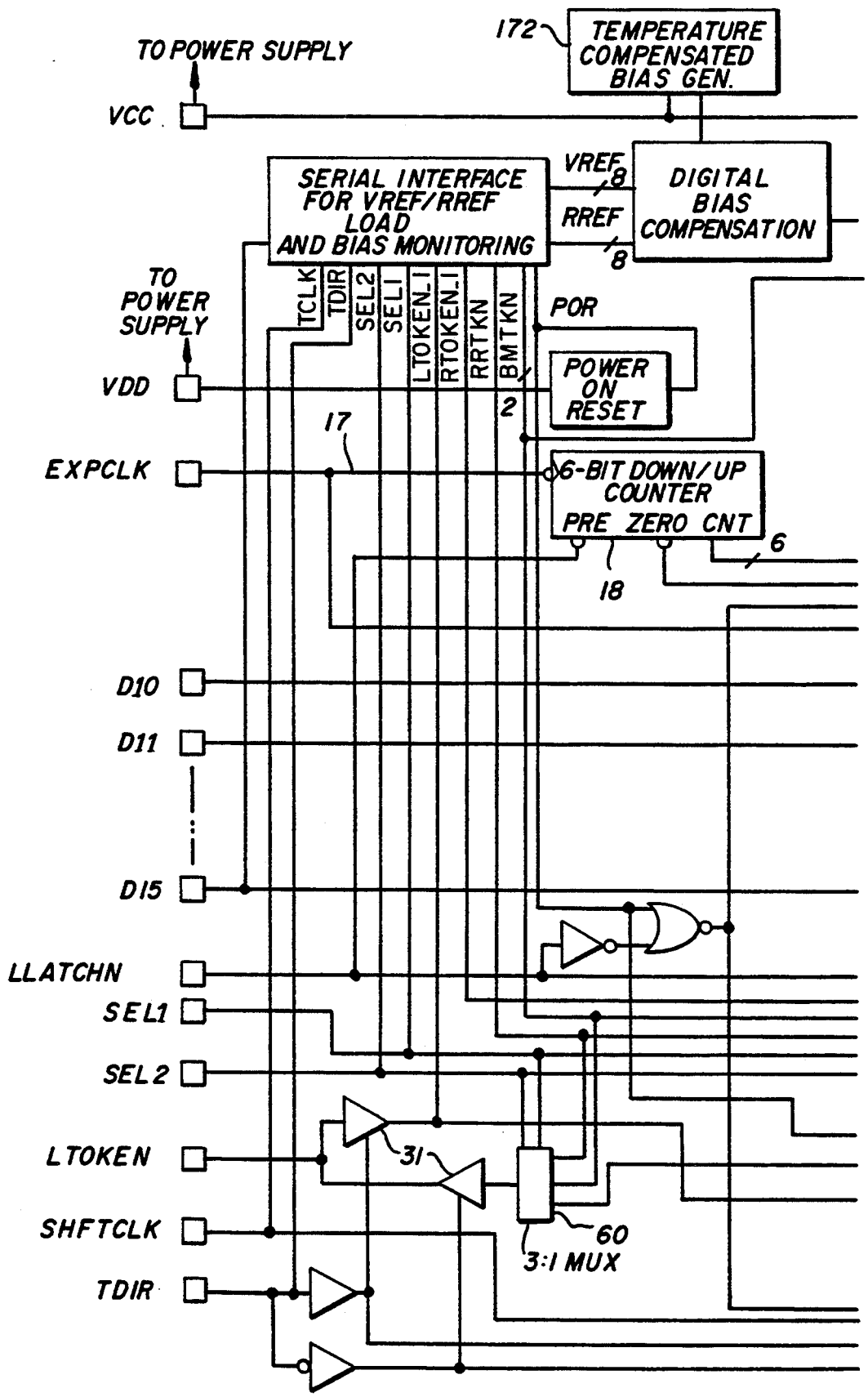
Figure 4B:
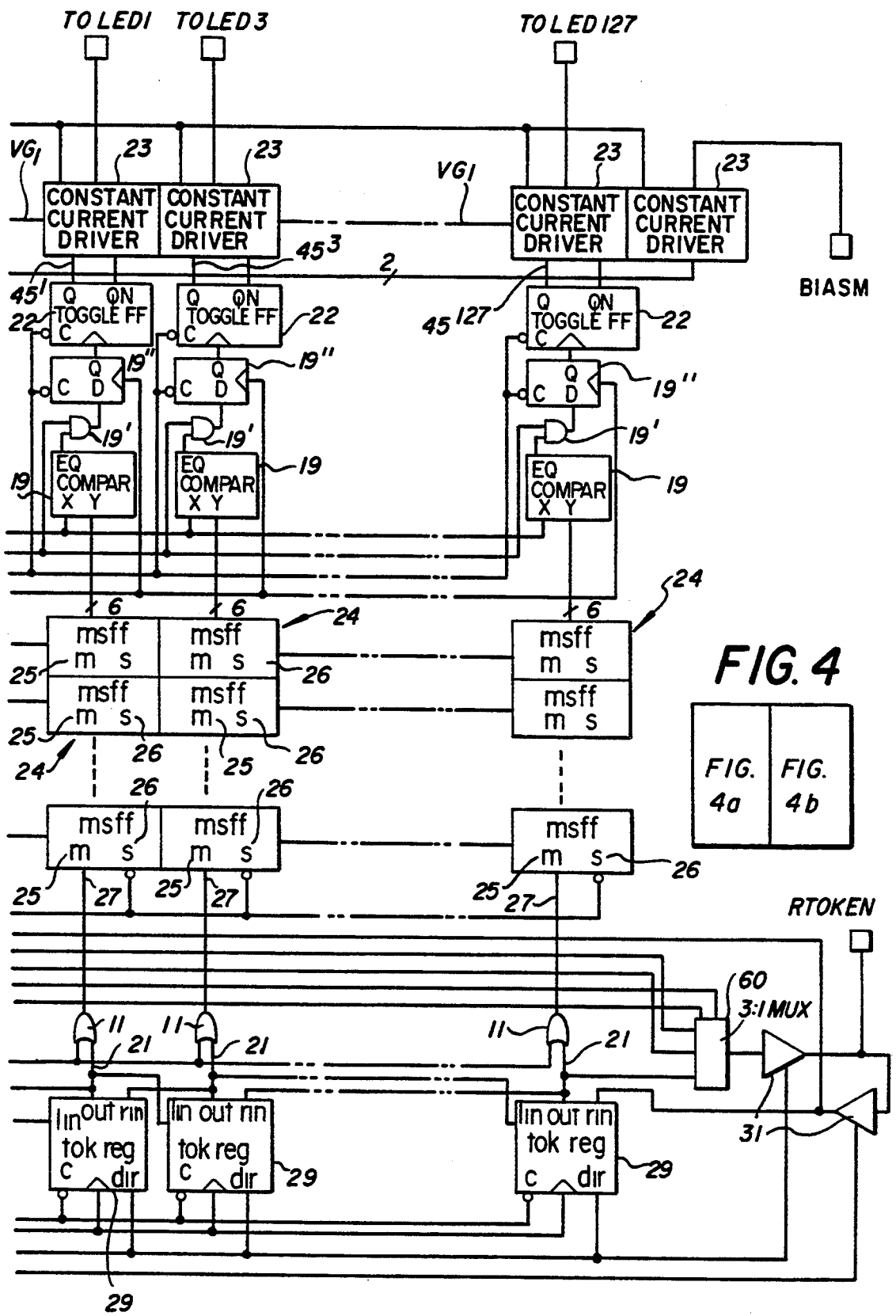

With reference now to FIG. 4a and 4b, description will be provided regarding operation of the circuitry within each driver chip. Before doing so, it will be noted that signals input to the printhead during a normal recording operation are typically derived from a data source such as a computer, word processor, image scanner or other source of digitized image data. This source provides image data signals to a data processor which may comprise a raster image processor. The data processor under control of clock pulses from a logic and control device (not shown) provides a plurality of outputs including rasterized data outputs and control signals which are fed to the printhead. In addition, the LCU provides clock pulses via line 17 to an down/up counter 18 (FIG. 4a) which, when enabled by a signal from the LCU, counts such clock pulses and provides at an output having a plurality of lines a digital signal representation of the state of the counter. Typically, such a counter has one line representing a least significant bit of such count and other lines representing other more significant bits. In accordance with a technique fully described in U.S. Pat. No. 4,750,010 in the names of Ayers et al, the contents of which are incorporated herein by this reference, the output of counter 18 is provided to a first set of input terminals to a comparator 19 (see FIG. 4b) associated with each recording element 30 (FIG. 6C), i.e., LED in this embodiment. A plurality of data lines from each of a plurality of corresponding data registers 24 is provided to a second set of input terminals associated with each comparator 19. The comparators 19 all compare the output of the counter 18 with the value of the respective data. As will be described herein, the image data signals provided to each comparator relates to a desired ON time or period of enablement for a respective LED 30 for the recording of a particular pixel. As is well known, the LED's are alternately divided into odd and even-numbered LED's so that respective integrated circuit driver chips therefore are located on opposite sides of the line of LED's. As the circuitry is identical for the corresponding driver chips, the discussion herein will be made as to one of these driver chips. The image data signals provided to each comparator 19 during the printing of a single line of dots by the row of LED's is related to the desired pixel or dot size to be exposed onto the image receiver medium by that LED for that particular line of dots. As shown in FIG. 4, six independent lines of data DI0 through DI5 provide a six bit digital image data signal that allows for grey-scale variation of the output of each LED during each cycle of operation. During each cycle the data to each comparator may comprise six binary bits representing an amount from decimal 0 to decimal 63. Although the data lines DI0 through DI5 are shown passing through the data registers 24 in FIG. 4, it will be appreciated that this is for the convenience of this illustration and that actually such lines comprise a bus or plurality of data lines that are simultaneously available to all data registers as will be described below.

Suppose, for example, that an LED, $LED_1$, is to be enabled for a time period equal to 20 clock periods plus $T_{MIN}$. $T_{MIN}$ represents a pre-established minimum LED on time. In response to a start pulse on line LLATCHN, the counter 18 is enabled and commences to count exposure clock pulses from line 17 from decimal 63 to 0. Note that the clock pulses may be generated to have a variable programmable period. The six bit output of counter 18 is coupled to one set of inputs at terminal X of each of the comparators. This counter is now compared with the data input at another set of inputs at terminal Y of this comparator which represents in binary form decimal ten. When there is a "match," i.e., when the count of terminal X is 10, a pulse is provided at the output terminal of comparator 19 to cause latch or toggle flip-flop 22 to enable the constant current driver 23 to commence and maintain current to $LED_1$. After the counter counts down to zero, the counter may be inhibited from counting additional clock pulses for a period $T_{MIN}$ that is either programmed into the counter or provided by other suitable means. After this predetermined time period $T_{MIN}$, if used, the counter is set to count in its up mode and commences counting clock pulses again. When the counter, in its count up mode, reaches decimal 10 the flip-flop 22 is reset and current to the LED ceases. The other LED's, etc. operate in similar fashion but their data may require different count values to turn on and off. What these LED's will thus have in common is that all will have their respective current pulses centered, i.e., the midpoints of the respective current pulses will occur at the same time. The pulse duration for each LED during each line of print is varied, however, in accordance with their respective image data signals. Reference is also made to U.S. application Ser. No. 07/290,002, regarding a clocking scheme using a non-linear clock, the contents of which are incorporated by this reference. As noted in this latter reference, correction for unequal light output from LED to LED may be provided by adjustment of the data in accordance with the characteristics of each LED. Thus, a programmable read only memory device or PROM or other programmable device may store the characteristics of each LED and data for that LED can be modified to provide an input count at terminal Y that represents data modified by the exposure characteristics of the LED. For example, for an LED that is a relatively strong light emitter the PROM would modify data bits for that LED to reduce the count that otherwise would be provided at terminal Y based solely on the data.

Still other circuitry for balancing the driving current to the LED's is described below.

The description of the circuitry forming a part of the driving circuitry for distributing the image data signals to the appropriate comparator and to current driving circuits will now be described. In the example of the circuitry for the printhead shown, the driving circuitry for the LED's are provided on opposite sides of the line of LED's 30. This is a known desirable arrangement for permitting LED's to be packed closer together to provide greater image resolution capabilities for the printer. As may be noted the circuit arrangement is an alternating one such that what may be called the even-numbered LED's have their respective driving circuitry located to one side of the line of LED's and what may be called the odd-numbered LED's have their respective driving circuitry located to the other side of the line of LED's. Typically, groups of, say, 64 of the odd numbered LED's will have their respective driving circuitry formed in a single integrated circuit chip and thus, for a print head having 3840 LED's on the print head, there may be 30 driving chips located on each side of the line of LED's. In order to save on production costs for these driving chips, it is desirable that they be identical. For the driving chips to be identical, although locatable on either side of the line of LED's, it is desirable for design simplicity that signals traversing the length of the print head be programmably movable in either direction.

The image data signals are output by a data processor in accordance with image data signals for the odd-numbered LED's and image data signals for the even-numbered LED's. Discussion will now be made with regard to the image data signals for the even-numbered LED's, since operation and circuitry for the odd-numbered LED's is identical. Data lines DI0–DI5 are independent lines each carrying a signal representing a digital bit (0 or 1) so that together their respective signals define a digital six bit number from decimal 0 to decimal 63. This image data signal is passed along lines DI0–DI5 on the printhead which comprise an image data signal bus. Associated with each LED is a data register means 24 for latching data from this bus during each cycle of operation for printing a single line of dots or pixels. As will be described, a token bit is used to enable a data register means associated with a particular LED to accept the data while other data register means associated with other LED's await their respective data.

The data register means 24 for each LED comprises a pair of latches 25, 26 or bi-stable multivibrators (msff=master-slave flip flop) for each of the six data lines. The pair of latches are connected in a master-slave relationship wherein in response to a token bit signal at the enable input terminal of the master latch 25, an image data signal at the data input terminal of the master latch 25 will cause the output of the master latch to either change or remain the same depending upon the image data signal. It will be noted that the six master latches 25 in the data register means of each LED are commonly connected to a line 27 to simultaneously receive the token bit signal from the token bit shift register 28.

The token bit shift register 28 comprises a series of flip-flops 29 which have clock pulses (SHFTCLK) applied to the clock terminals thereof and the signal representing the token bit input to the data input terminal of each. Note that the same token bit signal will be provided to both the even and odd token bit shift registers for the even and odd numbered LED's. The output of each of these flip-flops 29 is connected to the data input terminal of the next flip-flop 29 in the series. Buffers 31 with enable inputs and direction controls are coupled to the token bit shift register 28 so that programmable control may be made of the direction for shifting the token bit along the token bit shift register 28. In the example where the token bit is to be shifted from left to right in FIG. 4 for the Data Odd half of the print head, the signal line TDIR (token direction) is made at an appropriate logic level to allow the token bit on line LTOKEN to pass from left to right. Thus, in response to clock pulses from the data processor 16 the token bit is passed from stage to stage (left to right in FIG. 4) of the token bit shift register 28 and accordingly outputted sequentially over respective lines 21 through OR gates 11 to lines 27 for enablement of all the master latches 25 of a respective data register 24. With movement of the token bit from stage to stage of the shift register 28 the data bits occurring on lines DI0–DI5 are accepted by the data registers 24 in turn from left to right until all the 1792 data registers on this side of the print head have acquired their respective six bits of data. A latch enable signal is then pulsed high on line LLATCHN to cause the respective slave latches 26 to latch the data at their respective outputs and to reset the toggle flip-flops 22. The respective outputs of the slave latches 26 are now communicated to the data input terminals Y of the respective comparators 19 for determining the duration of exposure for each LED in accordance with the techniques described above. The comparators 19 each have at an output an AND gate 19' and a D type flip-flop 19'' in order to prevent the propagation of extraneous logic glitches from the comparator outputs to the toggle flip-flop inputs. The master latches 25 are now free to receive the image data signals for the next line of dots to be recorded.

After LLATCHN returns to its inactive level, on the first rising edge of EXPCLK while a particular comparator 19 output is at a logic high level, the respective toggle flip-flop 22 toggles from the reset state to the set state. The Q and QN outputs of this toggle flip-flop then cause the associated controlled current driver 23 to be enabled. After this same comparator's output has been returned to a low logic level, and then returns to a high logic level on some later rising edge of EXPCLK, the respective toggle flip-flop 22 toggles back to the reset state. The Q and QN outputs of this toggle flip-flop then disable the associated constant-current driver 23.

Figure 6A:
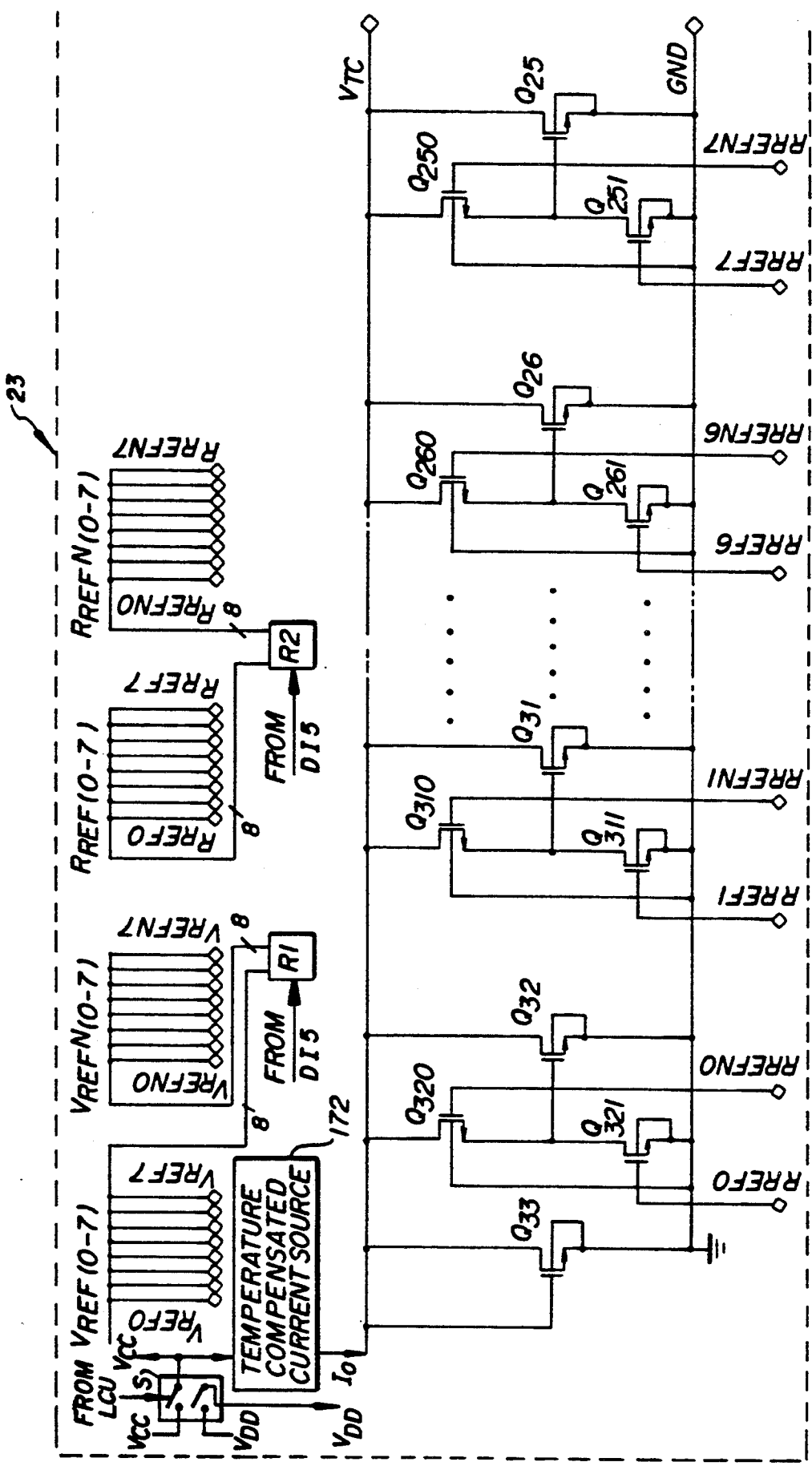
FIGS. 6A, 6B, and 6C represent schematics of still other circuits incorporated on the driver chip of FIGS. 4a and 4b.

With reference now to FIGS. 6A, B and C, the current driving circuit 23 portion of each driver chip is shown. The respective outputs of the toggle flip-flops 22 are fed over respective lines $45^1$, $45^3$, and the following lines not shown $45^5$,—$45^{125}$ and $45^{127}$. As may be seen each of these lines is actually a double line one of which carries an enable signal to turn the respective LED on and the other carries a complement of this signal. The lines $45^1$ are input to respective control electrodes of transistors $Q_{426}$, $Q_{427}$. These transistors act as switches and form a part of a current mirror driving circuit that includes a master circuit formed by transistors $Q_{424}$, $Q_{425}$ and a series of digitally controlled transistors. More details concerning the digitally controlled transistors will be found below with reference to the discussion of FIGS. 6A and 6B. Briefly, these digitally controlled transistors may be selectively turned on to establish a signal I (CHIP BIAS) to thereby regulate a desired current level for the LED's driven by this driver chip. As may be noted in FIG. 6C, circuitry for driving two LED's, i.e., $LED_1$ and $LED_3$ are illustrated; it being understood that the driver chip would have appropriate circuits typified by those described below for driving say 64 of the odd-numbered LED's in an LED chip array having, for example, 128 LED's. Another driver chip on the other side of the LED chip array would be used to drive the 64 even-numbered LED's.

The current through the master circuit establishes a potential $V_{G1}$ on line 117. Directly in series with $LED_1$ are two transistors $Q_{428}$, $Q_{429}$. Transistor $Q_{428}$ is biased to be always conductive while transistor $Q_{429}$ is switched on and off and thus is the transistor controlling whether or not current is driven to $LED_1$. The gate or control electrode of transistor $Q_{429}$ is coupled to the drain-source connection of transistors $Q_{426}$, $Q_{427}$. When $LED_1$ is to be turned on, transistor $Q_{427}$ is made conductive and when $LED_1$ is to be turned off, transistor $Q_{426}$ is made conductive. The gate of transistor $Q_{426}$ receives a logic signal that is the inverse of that to gate $Q_{427}$ from a data driven enabling means 22 that is the circuitry of FIG. 4 which controls whether or not an LED is to be turned on and for how long. As noted above in a grey level printhead, the LED is to be turned on for a duration determined by the grey level data signals input to the printhead.

Also associated with the circuitry for driving $LED_1$, is an additional current mirror that includes two slave circuits. One slave circuit comprises transistors $Q_{420}$, $Q_{421}$ and $Q_{430}$. The other slave circuit comprises transistors $Q_{422}$, $Q_{423}$ and $Q_{431}$. Transistors $Q_{430}$, $Q_{431}$ are N-channel MOSFETS while the other transistors noted above are P-channel MOSFETS. The two additional slave circuits associated with LED$_1$ are on continuously and assuming a nominal driving current of say $I_{LED1}=4$ ma to LED$_1$, the current through transistor Q$_{421}$ might be 1/80 $I_{LED1}$ and the current through transistor Q$_{423}$ might be 1/800×$I_{LED1}$. The currents through these slave circuits establishes a voltage level V$_{G2}$ on line 114, which is the potential of the drain electrode of transistor Q$_{427}$.

In operation with transistor Q$_{429}$ turned off, transistor Q$_{426}$ is on and impresses approximately the voltage V$_{cc}$ at the gate of transistor Q$_{429}$. When LED$_1$ is to be turned on to record a pixel (picture element), a signal is provided by the data enabling means 22 (see FIG. 4) to the gate of transistor Q$_{427}$ to turn same on, while an inverse signal turns transistor Q$_{426}$ off. Before transistor Q$_{429}$ turns on, the capacitive load or charge existing between its gate and substrate must be removed. When transistor Q$_{427}$ turns on, the charge on the gate terminal of transistor Q$_{429}$ discharges through transistors Q$_{427}$ and Q$_{430}$. This path for discharge of the gate capacitive load at transistor Q$_{429}$ thereby provides a turn-on time not affected by the number of LED's that are sought to be simultaneously energized. Additional description regarding this driving circuit is provided in U.S. application Ser. No. 07/543,507 filed Jun. 26, 1990 in the names of Mattern et al. Current through transistors Q$_{422}$, Q$_{423}$ and Q$_{431}$ is proportional to, i.e. mirrors, that through the master circuit because of the identical gate to source terminal biasing (V$_{GS1}$) of transistors Q$_{424}$ and Q$_{422}$. Thus, current is constant in this slave circuit even though V$_{cc}$ from power supply P$_2$ varies since the potential difference VGS$_1$ between the gate and source terminal of transistor Q$_{422}$ remains constant. The current through the slave circuit comprised of transistors Q$_{422}$, Q$_{423}$ and Q$_{431}$ is mirrored by that through the slave circuit comprised of transistors Q$_{420}$, Q$_{421}$ and Q$_{430}$ due to the identical gate to source biasing of transistors Q$_{430}$, Q$_{431}$. With a constant current being generated in the slave circuit comprised of transistors Q$_{420}$, Q$_{421}$ and Q$_{430}$, the potential difference between the gate and source terminals of transistor Q$_{420}$ remains fixed as does that of transistor Q$_{421}$ thereby establishing a voltage level V$_{G2}$ on line 114 which varies with V$_{cc}$ although the potential difference V$_{cc}$–V$_{G2}$ remains constant.

With the transistor Q$_{429}$ turned on and conducting driving current to LED$_1$ during an exposure period, the voltage level V$_{G2}$ is established at the gate of transistor Q$_{429}$ via now conducting transistor Q$_{427}$. The voltage level at the source terminal of transistor Q$_{429}$ is now at a fixed threshold value above that of V$_{G2}$. Transistor Q$_{429}$, acting as a cascade transistor and having its source terminal connected to the drain terminal of transistor Q$_{428}$, thereby establishes the drain potential of the transistor Q$_{428}$ as varying with changes in V$_{cc}$. As noted above, the potential difference V$_{GS1}$ is constant even though V$_{cc}$ itself varies. The voltage relationships between the various terminals of transistor Q$_{428}$ are not affected by variations in V$_{cc}$ and the current to LED$_1$ during a period for recording a pixel stays constant.

Thus, stability in driver current to LED$_1$ is provided since transient changes in V$_{cc}$ do not cause corresponding changes to the current conducted through LED$_1$ and thus do not affect the intensity level of light output by LED$_1$. The tendency in some LED printheads for light output of an LED to diminish when other LED's are turned on can also be reduced with this circuit. As noted above, transistor Q$_{429}$ conducts current to LED$_1$ for a time period controlled by the data bits for recording an appropriate pixel. The level of current for recording this pixel is controlled by the current mirror which is responsive to the current level I(CHIP BIAS). The circuit for generating I(CHIP BIAS) will now be described.

Figure 6B:
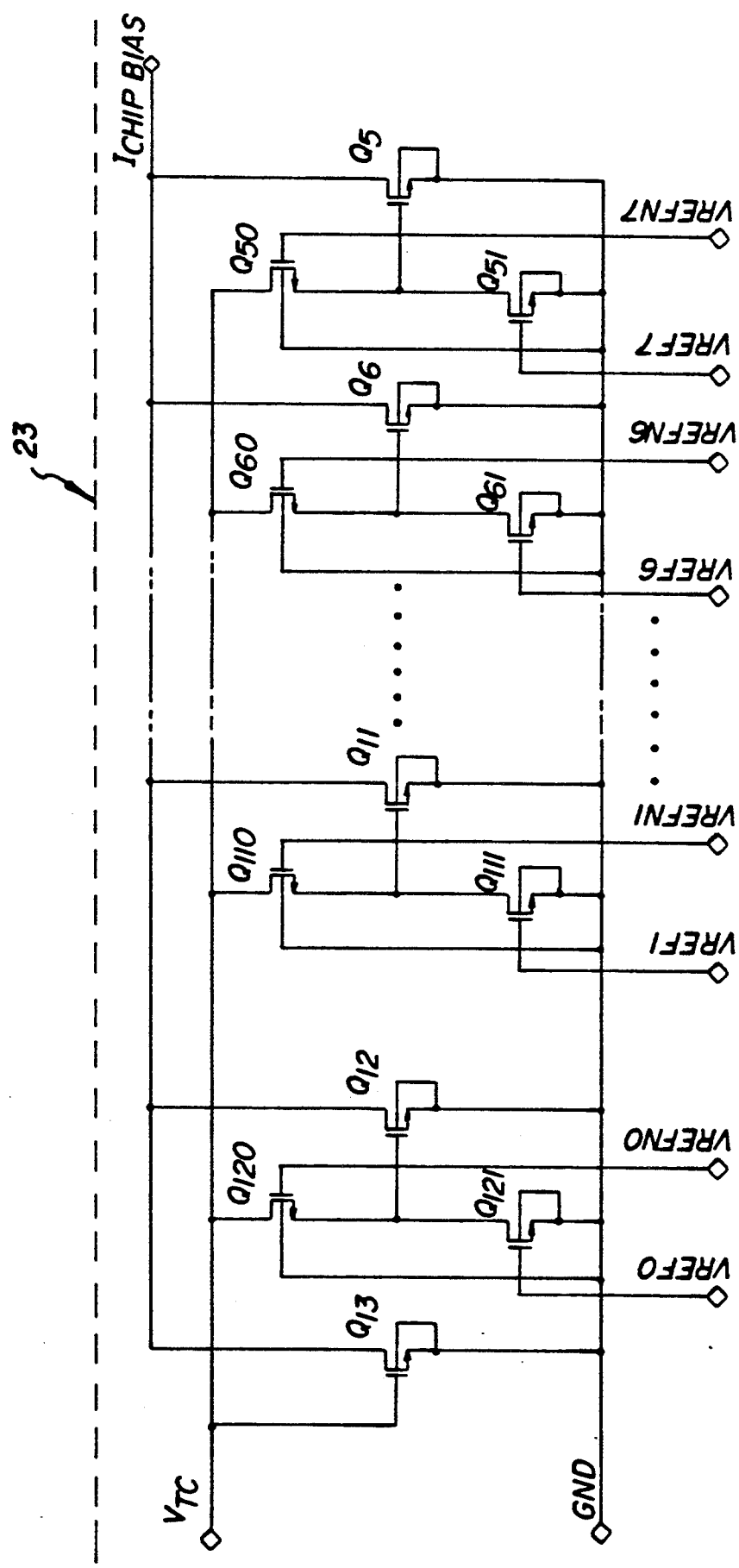
Figure 6C:
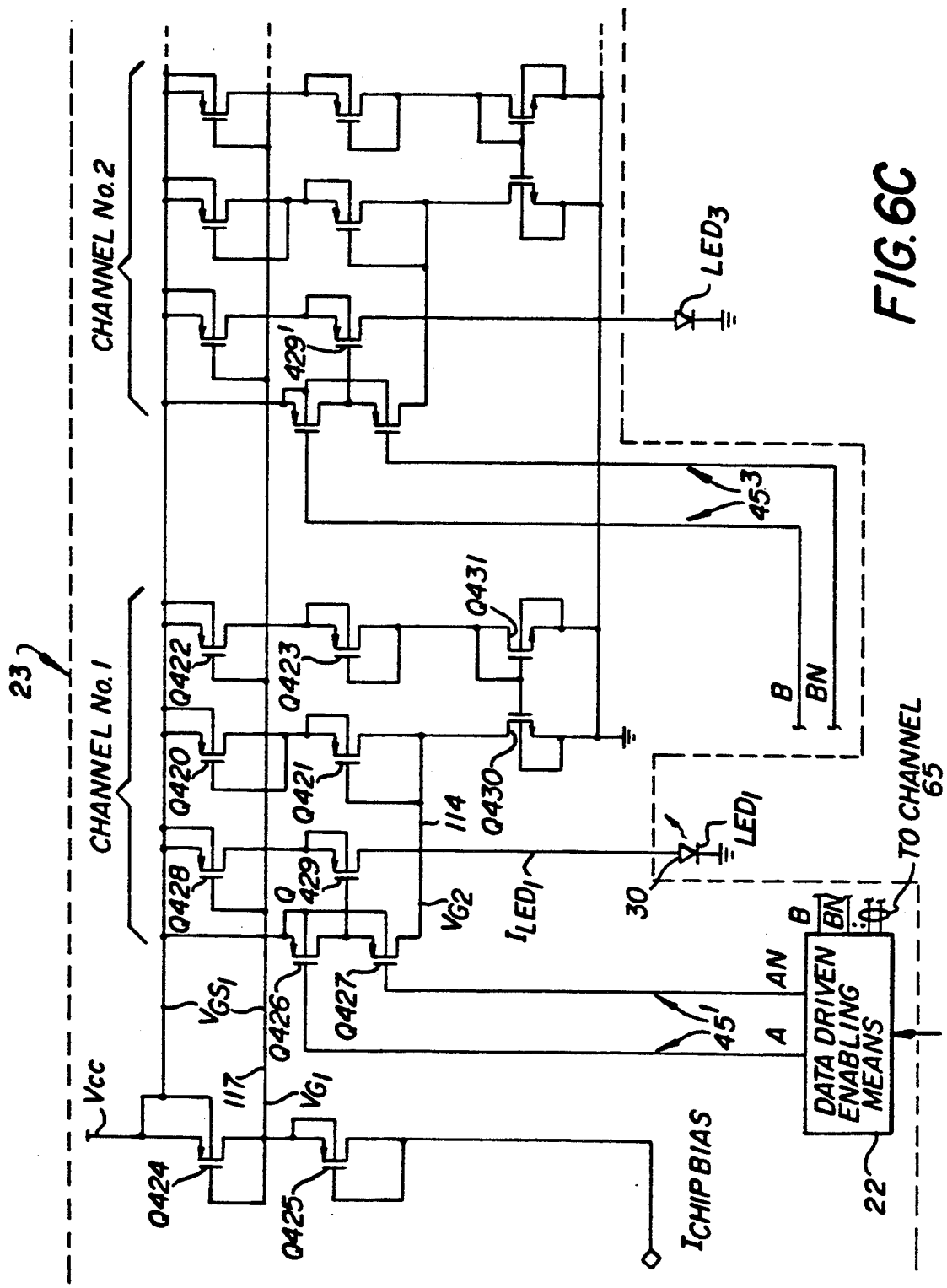

When transistor Q$_{429}$ is turned on, the current passing there through mirrors, i.e., is either the same or proportional to, the current passing through transistor Q$_{425}$. The current passing through transistor Q$_{425}$, in turn, is equal to I(CHIP BIAS). With reference now to FIGS. 6A and 6B, this current, I(CHIP BIAS) in turn is controlled by three factors comprising a temperature compensated current source 172, a first group of eight digitally controlled NMOSFET transistors Q$_{25}$, Q$_{26}$ . . ., Q$_{31}$, Q$_{32}$ and a second group of eight digitally controlled NMOSFET transistors Q$_5$, Q$_6$ . . ., Q$_{11}$, Q$_{12}$. Associated with the first group is a non-digitally controlled NMOSFET transistor Q$_{13}$. Similarly associated with the second group is non-digitally controlled NMOSFET transistor Q$_{13}$. As may be noted in FIGS. 6A and 6B, not all of the transistors are shown and the number of digitally controlled transistors provided in each group determines the level of control. Transistors Q$_{25}$, . . ., Q$_{32}$ are parallel connected transistors whose respective gate width to gate length ratios are scaled so that their respective currents are scaled or weighted in powers of two. For example, where eight digitally controlled transistors are provided for this first group (Q$_{25}$–Q$_{32}$), respective gate width to gate length ratios may be $$\frac{256}{5}:\frac{128}{5}:\frac{64}{5}:\frac{32}{5}:\frac{16}{5}:\frac{8}{5}:\frac{4}{5}:\frac{2}{5} \text{ and } \frac{321.5}{5}$$

for non-digitally controlled transistor Q$_{33}$.

Each digitally controlled transistor is controlled by a logic signal applied to a respective two-transistor switch circuit associated with the transistor. For example, the circuit defined by NMOSFET transistors Q$_{250}$ and Q$_{251}$ cause current to flow through transistor Q$_{25}$ when a high level logic signal is applied to the gate of transistor Q$_{250}$ and a complementary low logic signal is applied to the gate of transistor Q$_{251}$. The logic signals for controlling which of the current-carrying transistors are to be turned on are controlled by a register R$_2$ which stores an 8-bit digital word and its 8-bit complement representing a desired current control signal to turn on respective ones of the eight current conducting transistors Q$_{25}$, . . . Q$_{32}$. In conjunction with transistor Q$_{33}$, which is on continuously, this group of transistors is used for "localized" control of LED current. By this, it is meant that the digital word stored in register R$_2$ is specific for this driver chip and will be determined by adjustment of driver current to the LED'S driven by this driver chip until the LED's each provide a desired light output level. This digital word may be input to the register R2 from memory in the LCU or from a separate memory such as a ROM provided on the printhead. This digital word may also be changed in response to the temperature of the driver chip as will be described below. Briefly, the level of current from an extra current mirror channel (#65) on each driver chip is used as a measure of temperature. Further details regarding an extra driver channel are provided in U.S. application Ser. No. 07/543,929, filed Jun. 26, 1990 in the names of Potucek et al. A voltage generated by this current is digitized and compared by the LCU with a value based on the digital words in register R1 and R2. In response thereto, the LCU "writes" a new digital word into register R2, if a change in current level is required according to an algorithm stored in memory. At start-up, the driver chip is programmed to provide or default to a particular set of digital words for placement into registers $R_1$ or $R_2$. This will be discussed in greater detail below.

As noted in aforementioned U.S. Pat. No. 4,831,395, the contents of which are incorporated by this reference, the LCU may be programmed to maintain a count of prior activations of each LED and adjust a control voltage according to a program based on the aging characteristics of the printhead.

After this initial calibration and as the printhead ages through repeated use, both temperature and age factors operate to degrade light output. The affects due to aging will generally be similar to all LED's and are corrected for by adjustment of an 8-bit digital word and its 8-bit complement stored in register $R_1$.

This digital word controls 8 current-carrying NMOSFET transistors $Q_5, \ldots, Q_{12}$. Associated with this group of transistors is a continuously conducting NMOSFET transistor $Q_{13}$. Exemplary gate width to length ratios for weighted digitally controlled transistors $Q_5$–$Q_{12}$ are $$\frac{896}{5} : \frac{448}{5} : \frac{224}{5} : \frac{112}{5} : \frac{56}{5} : \frac{28}{5} : \frac{14}{5} : \frac{7}{5} \text{ and } \frac{4027}{5}$$

for non-digitally controlled transistor $Q_{13}$. The 8-bit word and its 8-bit complement stored in register $R_1$ is the same as that stored in identical registers $R_1$ on the other driver chips. As the printhead ages, a new 8-bit digital word and its 8-bit complement is calculated by the LCU and input into the registers $R_1$. The calculation of this 8-bit word for aging may be based on empirical determinations made using similar printheads or based upon a calibration of this printhead using an optical sensor that senses the output from each or selected LED's or by sensing patches recorded on the photoconductor.

As noted above, a third factor for adjustment to maintain LED uniformity of light output from chip-to-chip is a temperature compensated current source 172. This current source includes a temperature sensor and circuitry which will assist in boosting current to the LED's in response to increases in temperature. Various circuits for accomplishing this are well known for example, see Gray and Meyer, Analysis and Design of Analog Integrated Circuits, 2nd edition, pages 733–735 and FIG. 12.28, the contents of which are incorporated by this reference. In this text description is provided of so-called $V_T$ (thermal voltage) referenced current sources. By providing in such a circuit a resistor with an appropriate temperature coefficient, an output current, $I_o$, is provided that increases with an increase in temperature of the driver chip.

The operation of the circuit of FIGS. 6A, B and C will now be described. During use of the printhead the temperature of the driver chips will heat up differently in accordance with respective current carrying demands and abilities to dissipate heat caused by such demands through the heat-conducting structure to which the chips are mounted. The temperature compensated current $I_o$ is conducted to ground via NMOSFET transistor $Q_{33}$ and some, all or none of the transistors $Q_{32}, Q_{31}, \ldots$ and $Q_{25}$ depending upon the digital 8-bit signal and its 8-bit complement stored in register $R_2$. In accordance with which transistors in this group of transistors are enabled to conduct and recalling that these transistors are scaled or weighted differently in conducting capabilities the voltage level at the source terminal of $Q_{33}$ is determined. Note that switching transistors are associated with each of these digitally controlled transistors. For example, transistor $Q_{25}$ is controlled by switching transistors $Q_{250}$ and $Q_{251}$ in response to a signal causing $Q_{250}$ to conduct and $Q_{251}$ to turn off. The others are controlled similarly. This voltage level, $V_{Tc}$, is also applied to the gate of transistor $Q_{13}$ and thereby controls the current conducted by transistor $Q_{13}$. As noted above, transistor $Q_{13}$ is the non-digitally controlled transistor associated with the digitally controlled transistor group $Q_5, \ldots, Q_{11}, Q_{12}$. In accordance with the digital word stored in register $R_1$ selected ones of these transistors are caused to conduct thereby affecting the bias current level I (CHIP BIAS) through PMOSFET transistor $Q_{425}$. Recall that the transistors in this group of transistors also have scaled or weighted current-conducting capabilities. The current through PMOSFET transistor $Q_{425}$ is equal to the current conducted by the master circuit comprised of transistor $Q_{424}$, which current is replicated or scaled by current mirrors of PMOSFET slave transistors $Q_{429}$, $Q_{429'}, \ldots$ etc., i.e., the current controlling transistors to $LED_1$, $LED_3$–$LED_{127}$, respectively. Transistor $Q_{429}$ is caused to conduct when its respective logic transistors $Q_{426}$, $Q_{427}$ are appropriately signaled by data signals indicating a pixel to be printed. Thus, when a logic low signal is applied to line $45^1$ (AN) transistor $Q_{427}$ turns on and biases the gate of transistor $Q_{429}$ to the level $V_{G2}$. Since transistors $Q_{424}$ and $Q_{428}$ have identical biasing, the current through transistor $Q_{429}$ will mirror or be scaled to that of transistor $Q_{424}$ for the time period for exposing a pixel as controlled by the duration of the logic low signal on line $45^1$ (AN). As is noted in FIG. 6C, the current through $Q_{429}$ is fed to $LED_1$, for the recording of a pixel. Identical current levels will be developed in the other channels directly providing current to respective other LED's. Thus, all LED's driven by this driver chip receive the same current for periods determined by their respective enablement signals and the currents thereto are appropriately adjusted to maintain constant the intensity of the LED's.

Figure 5A:
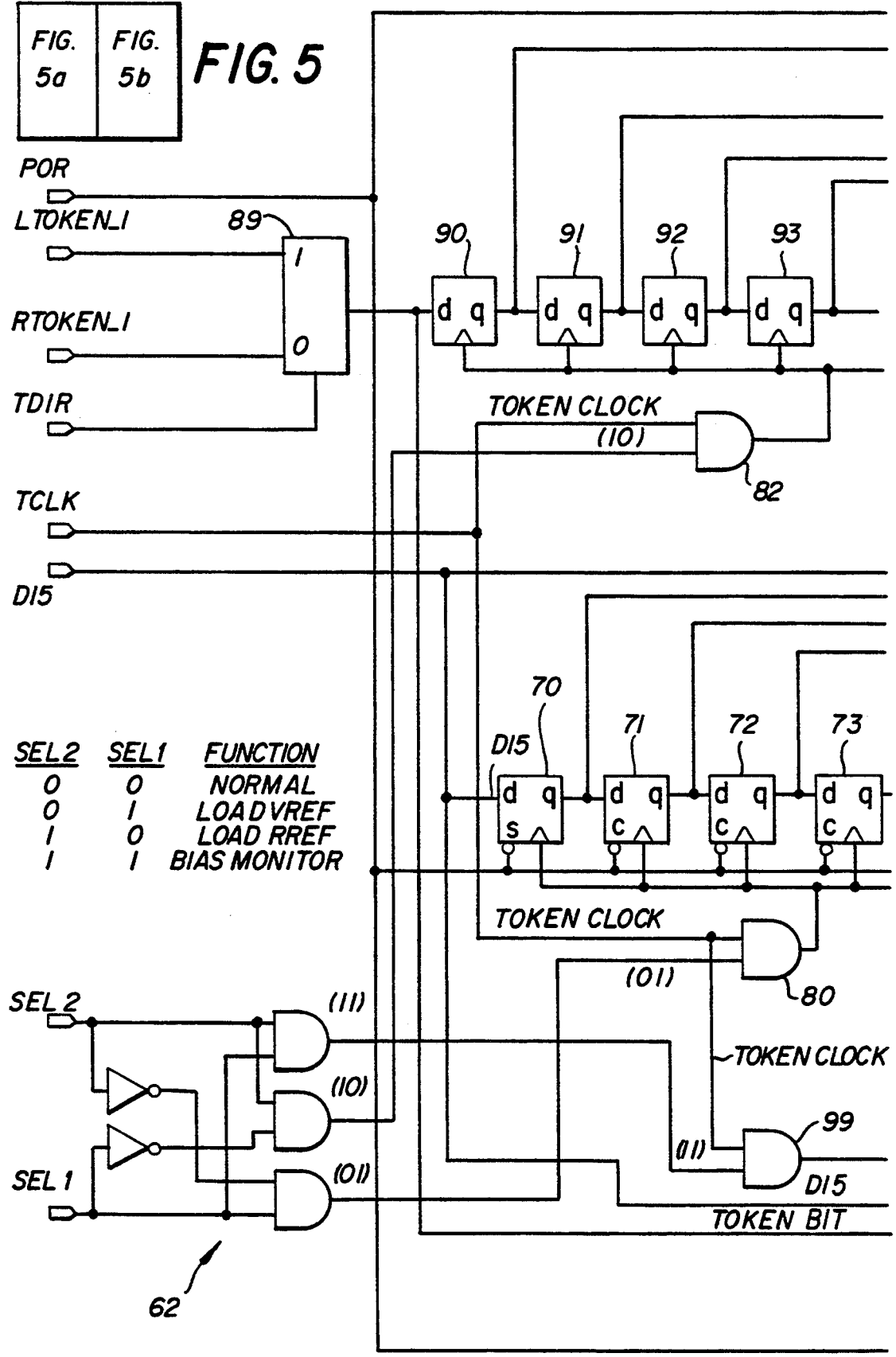

With reference now to FIGS. 4 and 5, description will now be provided of circuitry using the token bit and image data lines for purposes of regulating current to the LED's. As noted above, current to the LED's is controlled using digital words stored in registers $R_1$ and $R_2$. In order to minimize the number of lines going to the printhead and the number of connections of wires required to be bonded in fabricating a printhead having a multitude of driver chips, the token line used for latching image data as described above will also be used for latching current data to the various driver chips.

In FIGS. 4 and 5, lines SEL 1 and SEL 2 establish a two-bit selection of four possible operating modes of the token system. As noted in the chart accompanying FIG. 5, the options for these modes include a normal mode; i.e., one where the token is used for controlling image data to the appropriate registers 24 for latching image data, a load $V_{REF}$ mode wherein the digital current regulation word for loading register $R_1$, the global bias, is established; a load $R_{REF}$ mode wherein the digital current regulation word for loading register $R_2$, the local bias, is established. The fourth mode is referred to as a bias monitor mode and is used to check on the level of current sent to the LED's by sequentially operating channel 65 (not shown) of each driver chip. The use of an extra channel for monitoring operating current is more fully described in aforementioned U.S. application Ser. No. 07/543,929. This mode is directed to provide an indication of LED temperature to provide correction for loss of intensity and the details of such are not pertinent to the testing feature to which the invention is directed.

The use of the token bit for image data has been described above and is made when the "00" two-bit signal is established by the LCU at the inputs (SEL 2, SEL 1) of the 3:1 multiplexers 60 and the logic set 62 which forms a part of the circuitry of FIG. 5 referred to as the "serial interface for $V_{REF}/R_{REF}$ loading and bias monitoring." As noted in FIG. 5, the logic set may be in the form of interconnected logic AND gates. With a "00" signal, this serial interface is disabled. Data over lines DI0–DI5 is then appropriately latched by the master data flip-flops 25 in registers 24 as described above during shifting of the token bit over the token line LTOKEN and token registers 29. Data is then transferred in accordance with the techniques described above to control the duration of on-time for recording respective pixels.

After a period of use of the LED printhead there may arise, due to aging of the printhead, a need to adjust the current to all the LED's. Thus, a global bias adjustment is called for by the LCU in response to a determination by the LCU that the criterion for the need for such adjustment is met. Such a criterion may be a count of printing activations or time. In response, the LCU provides a signal "01" to lines SEL 2, SEL 1 during a non-production interval, as well as calculates, in accordance with an updating formula based on empirical data determined from aging this or similar printheads, an updated 8-bit word to be transmitted to all the driver chips. This updated current regulating data is transmitted serially over a single line DI5 of the image data bus (DI0–DI5) to the data input of a series of cascaded flip-flop registers 70–77, which form the register $R_1$ for storing signals $V_{REF(0-7)}$. The data over DI5 is shifted through these registers 70–77 in response to the token clock (TCLK) operating through an AND gate 80. Since DI5 is a line forming a part of the data bus the signal on line DI5 is available to all the driver chips and is latched simultaneously by the other driver chips. Thus, the $R_1$ registers of all driver chips are loaded simultaneously with the current control data signals $V_{REF(0-7)}$ in the above manner.

In order to load the "localized" current regulation signals $R_{REF(0-7)}$ into registers $R_2$, the LCU provides a "10" signal to SEL 2 and SEL 1. This enables latches to be responsive to the token clock through AND gate 82. The token bit carried on line LTOKEN is input via direction control gate 89 to latch register 90 and is then shifted through associated latches 91–97 in response to the token clock signal TCLK. The respective outputs of latches 90–97 are input to the clock inputs of registers $R_2$ storing the $R_{REF(0-7)}$ signals. As the token bit shifts through latches 90–97, the data on line DI5 is latched by the token bit in latches 90–97, into the respective flip-flops 98a–h that comprise registers $R_2$. At anyone time only one of the registers forming $R_2$ is enabled by the token bit and that register gets to latch the data currently on DI5. Note that DI5 is commonly connected to the data inputs of all the registers forming $R_2$. After being shifted down the latches 90–97, in response to the token clock the token bit is shifted out of this driver chip and into an adjacent driver chip for latching DI5 into the $R_2$ register flip-flops for the current drivers in the next driver chip and so on. Thus, the current control data from the LCU for registers $R_2$ is specific or local to each driver chip even though this data is carried on a data line of an image data bus that is commonly connected to all the $R_2$ registers of the driver chips located on one side of the row of LED's. In response to the connection of power to pad $V_{DD}$ (FIG. 4a) such as during startup and more pertinent to the invention, at the initiation of burn-in testing, a power on reset (POR) latch 179 is made to change its logic state and with reference to FIG. 5 it can be seen that line POR is connected to the set input of flip-flop 98a through 98h which comprise the $R_{REF}$ register $R_2$. The POR line is also connected to the clear inputs of flip-flops 98b through 98h, thereby setting the output of flip-flop 98a ($R_{REF7}$) to logic high and setting the outputs of lines ($R_{REF\,0-6}$) to logic low. This thus sets register $R_2$ with a value of 128. The POR line is also connected to the flip-flops 70–77 comprising register $R_1$. The line POR is connected to the set input of flip-flop 70 and to the clear inputs of flip-flops 71–77. The output of flip-flop 70 represents the most significant bit of register $R_1$ and thus registers $R_1$ and $R_2$ are both set to a digital representation of decimal 128. The value 128 is an intermediate value between 0, the minimum value, and 255, the maximum value, and will cause sufficient current $I_{CHIP\,BIAS}$ flowing through the master circuit that includes transistors Q424 and Q425 which is mirrored in the respective LED current channels when the LED's are activated. Of course, other values to which registers $R_1$ and $R_2$ may default to can be programmed.

Figure 3:
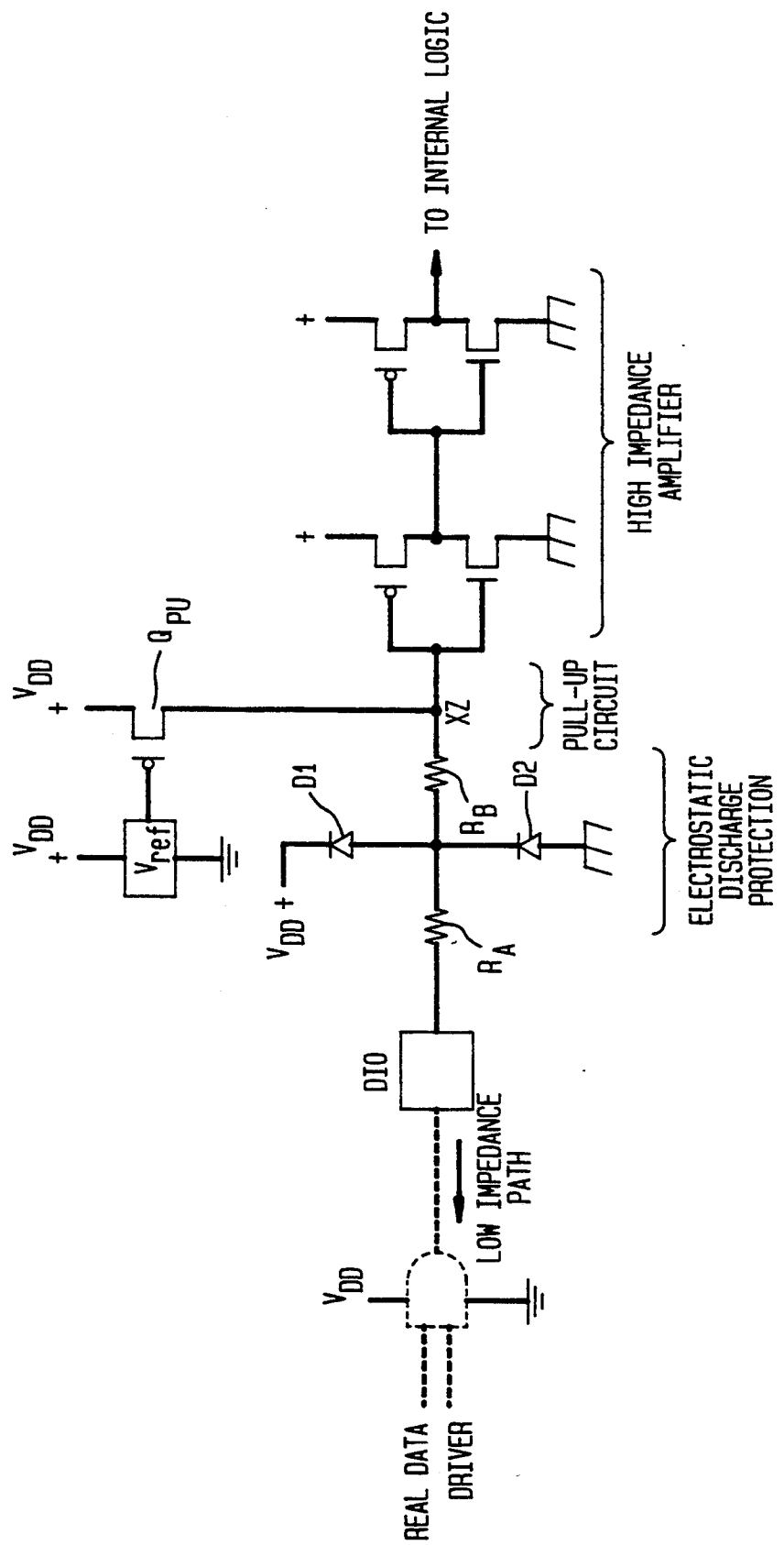
FIG. 3 is a schematic of a circuit associated with an input data pad on a driver circuit shown in FIGS. 4a and 4b.

In order to activate the LED's during burn-in testing, the circuitry requires that a data signal be input thereto. Since it is an object of the invention to minimize the number of required test pads, the invention proposes that a protective circuit be associated with the input pads of the data registers 24 and be designed so that such a data signal will be simulated at the inputs in the absence of normal data inputs to the data pads DI0–DI5. With reference now to FIG. 3, this protective circuit associated with each of the data pads DI0–DI5 may comprise an electrostatic discharge protection circuit that includes polysilicon resistors $R_A$ and $R_B$ with diodes D1, D2 having one terminal of each thereof connected to the junction between these resistors. The other terminals of parasitic diodes D1, D2 are connected to $V_{DD}$ and ground, respectively. Thus, a transient spike of voltage at input pad DI0 of a positive or negative extent is suitably discharged either through $V_{DD}$ or ground via diodes, D1, D2, respectively. A second part of the protective circuitry is referred to as a pull-up device circuit which comprises a weak low-valued current source typically generally 10 to 100 microamps or more of current through a tiny p-channel MOSFET transistor $Q_{PU}$. The gate of transistor $Q_{PU}$ is biased with an appropriate voltage $V_{REF}$ to control the current level. This transistor thereby establishes a voltage bias at the junction that is a simulated or pseudo logic high signal. This signal is amplified by a conventional high impedance amplifier circuit and is input to the latch 25 of data register 24. As the circuit illustrated for FIG. 3 is typical for the other data lines DI1–DI5, a similar pseudo data signal is input to their respective data latches.

It will be noted that the power "on" reset signal is also applied through OR gates 11 (FIG. 4b) to a clock input of each of the data latches 25. Thus, the signal on line POR acts as a clock signal for the master latch, which is a so-called transparent latch. When the clock input thereto goes logic high, the data input is accepted by the latch and as the clock input goes low, the last input on the latch remains. The power on reset signal is made sufficiently long to allow stabilization of the logic circuits in the diver IC. It is also wide enough to allow the data lives DI1–DI5 to pull up to their psuedo data values of logic 1. When the POR signal returns low, the pseudo data values are latched into the data latches 25. Pull-up or pull-down circuits for CMOS logic devices are known and used to avoid floating which tends to draw current on CMOS devices or cause oscillations. However, significant advantage is obtained by having the pull-up circuit be used for simulated data logic as described herein. The respective pull-ups are easily overdriven when normal data signals are applied during printing operation of the printhead. As may be seen in phantom in FIG. 3 the driver for inputting real data to the pad DIO provides a low impedance path that establishes either $V_{DD}$ for digital logic high or ground or near ground potential for digital logic low using a typical AND or NAND gate that has real data input at its inputs. A typical NAND gate driver is T. I. AS00. The pull-up circuitry could also be a high-value resistor being fed by a small current in lieu of the weak p-channel device shown. Still other circuits may be used to accomplish this simulated data input.

Figure 8:
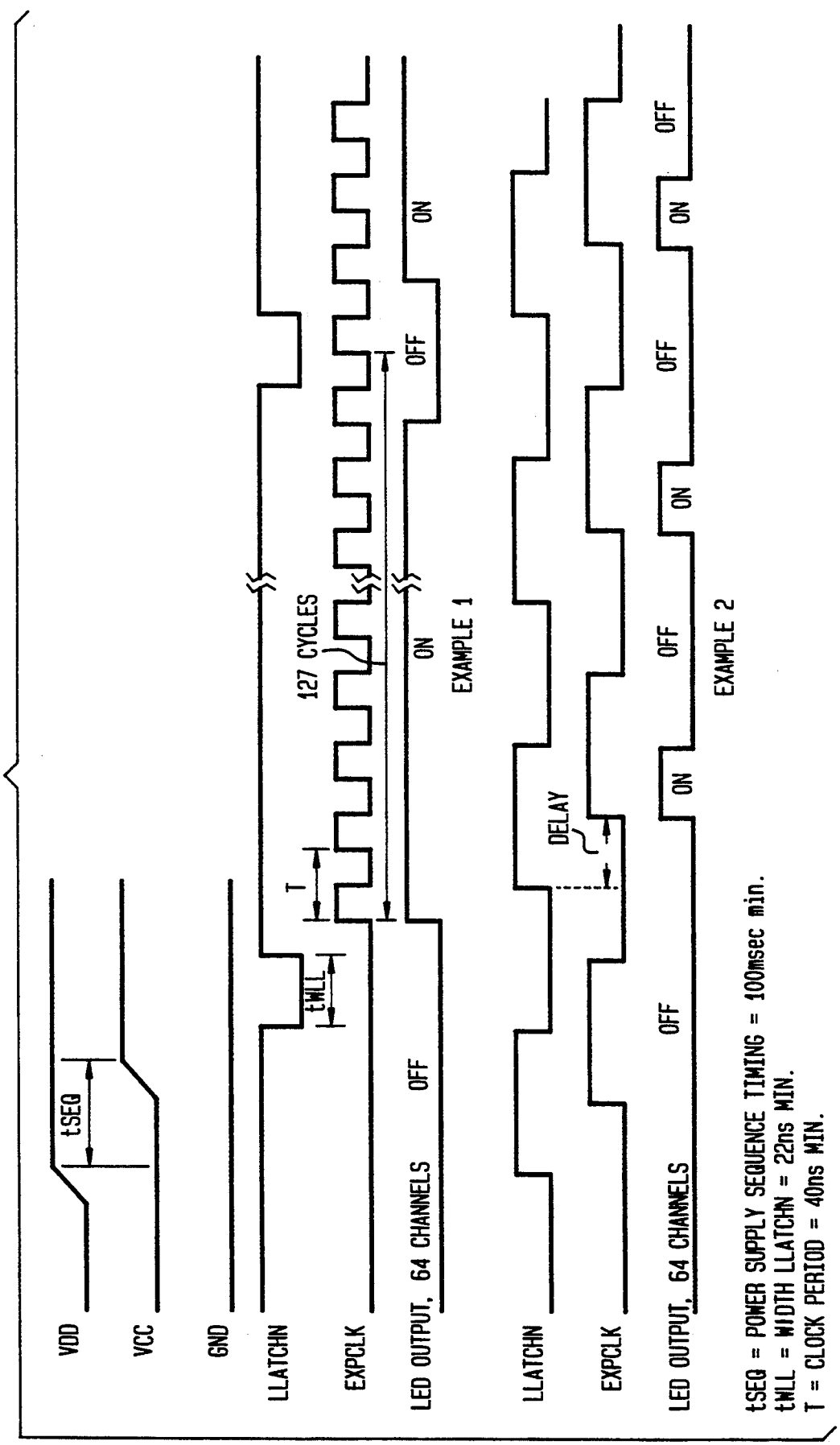
FIG. 8 is a timing diagram illustrating the timing of signals applied to test pads during burn-in testing.

With reference now to FIG. 8, two examples are illustrated of timing or control signals that may be used to actually initiate current flow to the LED's during burn-in testing. Upon a transition of the signal LLATCHN to a logic low level, the counter 18 is preset to a count of 63. With a transition back to logic high level, the simulated data stored in the latch registers 24 is latched at the output registers 24. The outputs of all AND gates 19' are now at logic high because the counter 18 output value is 63, and the pseudo data latched to the outputs of all registers 24 is 63. Thereafter, a logic low to high transition on line EXPCLK clocks the logic high from AND gates 19' through D-type flip-flops 19". The logic low to high transitions on the Q outputs of D-type flip-flops 19" clocks the toggle flip-flops 22 which then provide a current enable signal to lines $45^1$, $45^3$ . . . $45^{127}$. As noted above, in the discussion of the current driver during normal printhead operation, transistors Q426, Q427 now appropriately biased to turn on transistor Q429 for current to flow to LED1. Similarly, current flows to all the LED's as the level thereof mirrors or is proportional to $I_{CHIP\ BIAS}$.

In example 1 of FIG. 8, the clock signals applied on line EXPCLK are pulsed for 127 cycles which is similar to that used in the normal clocking scheme for printhead operation to have the counter operate and count down from 63 to 0 and then backup to 63 upon which occurrence the LED's are turned off. The LLATCHN signal is then caused to go logic low to reset the counter and when traversing to logic high once again, latches the simulated data now at the output of the registers for enablement of the LED's for the next pixel cycle during burn-in testing.

In example 2 of FIG. 8, the signals LLATCHN and EKPCLK are of the same frequency. What this does is maintain the count during each cycle at the count of 63 for the duration of LED pixel on-times during each cycle. The frequency of LLATCHN pulses may be controlled to determine the number of "on-off" cycles of the LED's per second. The delay between the transitions to logic high by LLATCHN and that of EXPCLK represents the "on-time" duty cycle of the LED. As shown in Example 2, with the LLATCHN and EXPCLK signals 90 degrees out of phase a duty cycle of 25% is established. By adjustment of the delay, the duty cycle is changed.

Thus, there has been shown that with a minimum of five pads that a burn-in testing of a module may be made and controlled even though many more control and data inputs would be required during normal printhead operation. Typical values for $V_{cc}$ and $V_{DD}$ might be 4.5–5.0 and 4.5–5.5 volts D.C., respectively. Further reductions on pads may be made if desired by a circuit that combines $V_{cc}$ and $V_{DD}$.

While the preferred embodiment has been described in terms of MOSFET transistors that have their respective gates controlled, other devices providing an equivalent function such as bipolar or other gate controlled devices are also contemplated. Where bipolar transistors are used, transistor-geometry or doping levels to respective transistors may be modified to provide the current scaling characteristics described herein.

The use of a pull-up circuit for all data lines DI0–DI5 is a matter of choice and provides the advantage that on-times are controlled for maximum periods. If desired, however, only some of the data lines may be used to simulate pseudo data for enabling the recording elements. In the specific circuit described above, the lines SEL1 and SEL2 are preferably set logic low by suitable pull-down devices associated with their respective input pads to ensure that during burn-in testing transients on the shift token clock lines won't change registers $R_1$, $R_2$. All the other input pads may have pull-up devices associated with them. The clocking scheme of FIG. 8, Example 2, assumes that all the data input lines have pull-up devices associated with them. In the specific circuit illustrated herein at least one of the data lines needs to be set logic high for the timing circuit of FIG. 8, Example 1, to be used. Furthermore, the data signals may be used to control a current driver circuit that changes in intensity with respect to data rather than exposure period in recording a pixel, or changes intensity and period or some other exposure or recording parameter.

While the invention has been described with regard to a testable module the term testable assembly also contemplates an entire printhead or sub-groups thereof. The invention, although disclosed with reference to LED's is applicable to other recording elements such as lasers, devices which change transmissivity, electrographic writers, etc.

The invention has been described in detail with particular reference to preferred embodiments thereof, but it will be understood that variations and modifications can be effected within the spirit and scope of the invention.

We claim:
1. A testable printer module, said module comprising:
   a recording element;
   a data register means for storing a digital logic image data signal;

a driver circuit means responsive to the image data signal for enabling the recording element;

an input lead coupled to the data register means for providing an image data signal to the data register means;

bias circuit means coupled to said lead for providing to said lead a bias signal suitable as a pseudo image data signal and means coupled with the driver circuit means for enabling the recording element in response to said pseudo image data signal when a real image data signal is not provided to said data register means; and means for adjusting a duty cycle of energizing the recording element during test when a real image data signal is absent on said lead.

2. The module of claim 1 and including an integrated circuit driver chip, the driver chip incorporating the driver circuit means, the data register means, the input lead and the bias circuit means; and conductor means external to said driver chip and coupled to said driver chip for providing a real data signal to said input lead.

3. The module of claim 2 and wherein said conductor means is formed on a circuit board, the circuit board having a plurality of test pads for inputting signals and electrical power for use in testing said assembly.

4. The module of claim 1 and including means for adjusting a frequency of energization of the recording element during test when a real image data signal is absent on said lead.

5. The module of claim 1 and including a plurality of input leads coupled to the data register means for providing a multibit digital logic image data signal representing an exposure time period and a plurality of respective bias circuit means each coupled to a respective lead for providing to a respective lead a bias signal suitable as a pseudo image data signal when a real data signal is absent on said lead.

6. The module of claim 5 and wherein the bias signal is generated by a current source that is overridable by a real image data signal on said lead.

7. The module of claim 6 and including an integrated circuit driver ship, the driver chip incorporating the driver circuit means, the data register means, the input leads and the bias circuit means; and conductor means external to said driver chip and coupled to said driver chip for providing real image data signals to said input leads.

8. The module of claim 7 and wherein said conductor means is formed on a circuit board, the circuit board having a plurality of test pads for inputting signals and electrical power for use in testing said module.

9. The module of claim 1 and wherein the recording element is a light-emitting diode.

10. The module of claim 1 and wherein the bias signal is a current that is overridable by a real data signal on said lead.

11. The module of claim 2 and wherein the bias signal is a current that is overridable by a real data signal on said lead.

12. A testable printer assembly, said assembly comprising:

a plurality of recording elements, an integrated circuit driver chip electrically coupled to said plurality of recording elements, said driver chip including driving means including a plurality of logic device means each responsive to an externally applied real image data signal for selectively determining an exposure parameter for controlling energization for recording of a pixel by a corresponding one of the recording elements, and means internal to said driver chip for generating a pseudo image data signal to said logic device means in response to application of external power to said driver chip, and said driving means being responsive to said pseudo image data signal for driving said recording elements a real image data signal to said driver chip.

13. The assembly of claim 12 and including a circuit board having a plurality of test pads for inputting clock signals and electrical power, the circuit board including conductive means coupled to said driver chip and said test pads for conducting said clock signals and electrical power for use in enabling said recording elements during testing of said assembly.

14. The assembly of claim 13 and wherein the recording elements are light-emitting diodes.

15. The assembly of claim 12 and wherein the means for generating the pseudo image data signal is a current generating circuit that is overridable by a real image data signal.

16. A method for burning-in a recording element having integrated circuit driver that is electrically coupled to said recording element, said method comprising the steps of:

applying an electrical power signal to said driver from a source external to said driver;

in response to said electrical power signal generating internally in said driver a pseudo image data signal to a data register forming a part of said driver; and applying a control signal to said driver to initiate an energization of said recording element by the driver that is responsive to said pseudo image data signal without providing, from a source external of said driver, a real image data signal to said driver.

17. A testable printer assembly, said assembly comprising:

a plurality of recording elements, an integrated circuit driver means electrically coupled to said plurality of recording elements for energizing said recording elements in response to signals representing an exposure parameter, said driver means including logic means responsive to real image data signals provided by a source external of said driver means for selectively determining said, and means internal to said driver means for generating pseudo image data signals and communicating the pseudo image data signals to said logic means in response to application of external power to said driver means and without communication of real image data signals to said logic means, said driver means energizing said recording elements in response to said pseudo image data signals.

18. The assembly of claim 17 and wherein the integrated circuit driver means is incorporated on an integrated circuit chip and electrodes are provided on said chip for coupling the chip to a source for providing external power and to a source for providing real image data signals.

* * * * *